United States Patent
Banner et al.

(10) Patent No.: US 8,891,896 B2
(45) Date of Patent: Nov. 18, 2014

(54) ESTIMATING BLUR DEGRADATION OF AN IMAGE USING SPECULAR HIGHLIGHTS

(75) Inventors: Ron Banner, Haifa (IL); Carl Staelin, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 731 days.

(21) Appl. No.: 13/145,098

(22) PCT Filed: Jan. 22, 2009

(86) PCT No.: PCT/US2009/031655
§ 371 (c)(1),
(2), (4) Date: Jul. 18, 2011

(87) PCT Pub. No.: WO2010/085249
PCT Pub. Date: Jul. 29, 2010

(65) Prior Publication Data
US 2011/0286682 A1    Nov. 24, 2011

(51) Int. Cl.
*G06T 5/00* (2006.01)
*G06T 7/00* (2006.01)
*H04N 5/14* (2006.01)

(52) U.S. Cl.
CPC .............. *H04N 5/142* (2013.01); *G06T 7/0002* (2013.01); *G06T 5/003* (2013.01); *G06T 2207/30168* (2013.01)
USPC ....................................................... 382/255

(58) Field of Classification Search
CPC . G06T 5/00; G06T 5/003; G06T 2207/20101; G06T 2207/20104; G06T 2207/20192; G06T 2207/20201
USPC .................................. 382/254, 255, 260, 263
See application file for complete search history.

(56) References Cited

U.S. PATENT DOCUMENTS

| | | | |
|---|---|---|---|
| 2006/0115174 A1 | 6/2006 | Lim et al. | 382/260 |
| 2007/0216765 A1 | 9/2007 | Wong et al. | 348/46 |
| 2008/0025627 A1 | 1/2008 | Freeman et al. | 382/255 |
| 2008/0266413 A1 | 10/2008 | Cohen et al. | 348/222.1 |

OTHER PUBLICATIONS

Extended European Search Report mailed on Jul. 11 2012 in counterpart European Application No. 09838997.6.
Oh et al., "Information frame classification for endoscopy video," Medical Image Analysis, Oxford University Press, Oxford, GB. vol. 11, No. 2 (Mar. 8, 2007).
Bernard Chalmond, "PSF Estimation for Image Debiurring," CVGIP: Graphical Models and Image Processing, vol. 53, No. 4, July, pp. 364-372, 1991.
An iterative techniques for the rectification of observed distributions, L. B. Lucy, Astronomical Journal: vol. 79, No. 6, pp. 745-754, 1974.
"Blind Restoration of Atmospherically Degraded Images by Automatic Best Step-Edge Detection" O. Shachem, O. Haik and Y. Yitzaky), Pattern Recognition Letters 28 (2007) 2094-2103.

(Continued)

*Primary Examiner* — Andrew W Johns

(57) ABSTRACT

A method and apparatus (70) is provided for estimating blur degradation of an image (75) that includes a specular highlight. A specular highlight in the image is first identified (77), for example with user assistance. A blur kernel is then derived by extracting (78A) the identified specular highlight as foreground from the image (75) and using the extracted foreground as the blur kernel (78C). The image (75) can then be deblurred by deconvolution (79) with the derived blur kernel.

19 Claims, 5 Drawing Sheets

(56) References Cited

OTHER PUBLICATIONS

Stephen E. Reichenbach et al., "Characterizing digital image acquisition devices," Optical Engineering I Feb. 1991 I vol. 30 No. 2, pp. 170-177.

Anat Levin et al., "A Closed Form Solution to Natural Image Matting," Proceedings of Ihe 2006 IEEE Computer Society Conference on Computer Vision and Pattern Recognition (CVPR'06), pp. 1-8, 2006.

"DECONVLUCY Image restoration using Lucy-Richardson algorithm." The MathWorks, Inc, Revision.: 1.6, http://www.mathworks.com/help/toolbox/images/ref/deconvlucy.html (1994).

Hon-Sum Wong et al., "Effect of knife-edge skew on modulation transfer function measurements of charge-coupled device imagers employing a scanning knife edge, " Optical Engineering I Sep. 1991 I vol. 30 No. 9, pp. 1394-1398.

Oren Haik et at, "Effects of image restoration on acquisition of moving objects from thermal video sequences degraded by the atmosphere," Optical Engineering 45(11), 117006 (Nov. 2006), pp. 117006-1-117006.8.

I. Dror and N. S. Kopeika, "Experimental comparison of turbulence modulation transfer function and aerosol modulation transfer function through the open atmosphere," J. Opt. Soc. Am. AJvol. 12, No. 5/May 1995, pp. 970-950.

"A Closed Form Solution to Natural Image Matting" A. Levin D Lischinski and Y. Weise, IEEE Conf. on Computer Vision and Pattern Recognition (CVPR), p. 61-68, Jun. 17-22, 2006, New York.

Yitzhak Yitzhaky, "A Method for Objective Edge Detection Evaluation and Detector Parameter Selection," IEEE Transactions on Pattern Analysis and Machine Intelligence, vol. 25, No, 8, Aug. 2003, pp. 1027-1033.

Elisa H. Barney Smith, "PSF estimation by gradient descent fit to the ESF," SPIE—Image Quality and System Performance III, Jan. 2006, pp. 1-9.

"Reducing Specular Reflection Components of Metallic Surfaces Using Photometric Linearization" Zhong Zhang, Ren Shiging, M. Tetsuo, H. Fujiwara, and T. Imamura, Innovative Computing, Information and Control, 2006, IEEE ICICIC '06, pp. 1-4.

Shree K. Nayar et al., "Removal of Specularites Using Color and Polarization," Computer Vision and Pattern Recognton, 1993. Proceedings CVPR '93 pp. 583-590 (1993).

JungHwan Oh et al., "Informative frame classification for endoscopy video," Elsevier, Medical Image Analysis 11 (2007) pp. 110-127.

ESTIMATING BLUR DEGRADATION OF AN IMAGE USING SPECULAR HIGHLIGHTS

CROSS-REFERENCE TO RELATED APPLICATIONS

This application is a National Stage application of International Application No. PCT/US2009/031655, filed Jan. 22, 2009, the disclosure of which are hereby incorporated by reference in its entirety.

FIELD OF THE INVENTION

The present invention relates to a method and apparatus for estimating blur degradation of an image that includes a specular highlight.

BACKGROUND OF THE INVENTION

Image restoration is the process of estimating an image from a corrupted image that has undergone some degradation such as blur or additive noise. To perform any sort of image restoration, knowledge of the degradation process is required. In the absence of information about the imaging system that was used to capture a given degraded image, the degradation has to be estimated directly from the degraded image itself; this type of estimation is known as blind estimation.

Blur degradation of an image is typically modelled as the interaction of the un-degraded image with a blurring function called the blur kernel, the form of this interaction being, for example, expressed as the convolution, in the spatial domain, of the blur kernel with the pixels of the un-degraded image.

Previous approaches to blind estimation of blur degradation typically assume frequency domain constraints on images or a simplified parametric form for the blur kernel shape. However, real-world blurs are usually much more complicated, often contain high frequency components and only rarely can be accommodated by functions that contain a small number of parameters. For example, although the blur kernels that are induced by camera shake are complicated and may contain convoluted paths, motion is often assumed to be linear (i.e., the blur kernel is characterized solely by angle and size). Similarly while focal blur is often modelled as a simple circular disk or a low frequency Fourier component (e.g., a normalized Gaussian function), in practice the blur kernel shape is far more elaborate and may contain sharp edges.

Several blur estimation methods have been proposed in the literature which are based on the estimation of the blur function from a degraded ideal step-edge (for example, see the paper: "Blind Restoration of Atmospherically Degraded Images by Automatic Best Step-Edge Detection" O. Shacham, O. Haik and Y. Yitzaky). Usually the ideal step-edge is a high contrast straight edge that is long enough so that noise will be averaged over a large area; high contrast and straight edges are sought because they yield better signal to noise ratio and because they are common and relatively reliable for analysis. From each such degraded ideal step-edge it is then possible to estimate the projection of the blur kernel in the direction of the considered edge. Unfortunately, even if several edges running in different directions are taken into account, it is very difficult to derive the blur kernel accurately.

SUMMARY OF THE INVENTION

According to one aspect of the present invention, there is provided a method of estimating blur degradation of an image that includes a specular highlight, the method comprising data processing apparatus:

identifying a specular highlight in the image; and
deriving a blur kernel by extracting the identified specular highlight as foreground from the image and using the extracted foreground as the blur kernel.

The present invention also provides corresponding data processing apparatus for estimating blur degradation of an image that includes a specular highlight.

BRIEF DESCRIPTION OF THE DRAWINGS

Embodiments of the invention will now be described, by way of non-limiting example, with reference to the accompanying diagrammatic drawings of embodiments of the invention, in which.

BEST MODE OF CARRYING OUT THE INVENTION

In principle, the reflection of light from surfaces in real scenes can be classified into two main categories: diffuse and specular. Diffuse reflections results from light rays that penetrate the surface, undergo multiple reflections, and then re-emerge. On the other hand, specular reflection is a surface phenomenon i.e., light rays incident on the surface are reflected such that the angle of reflection equals the angle of incidence. Light energy due to specular reflections is usually concentrated in a compact lobe, causing strong highlights (bright regions) to appear in the image. These specular highlights may naturally appear in reflections from shiny objects (e.g., water, metal, glass, etc). By way of illustration, FIG. 1A shows an original, un-blurred, scene 10 including a specular highlight (indicated by dotted circle 11 that is centred on the highlight).

Figure 1A:
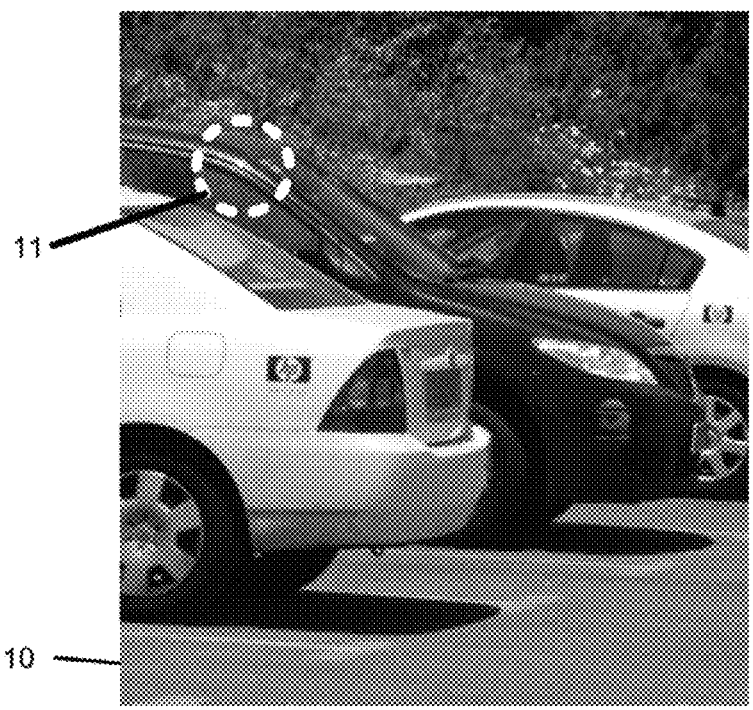
FIG. 1A is an example un-blurred image exhibiting a specular highlight.
Figure 1B:
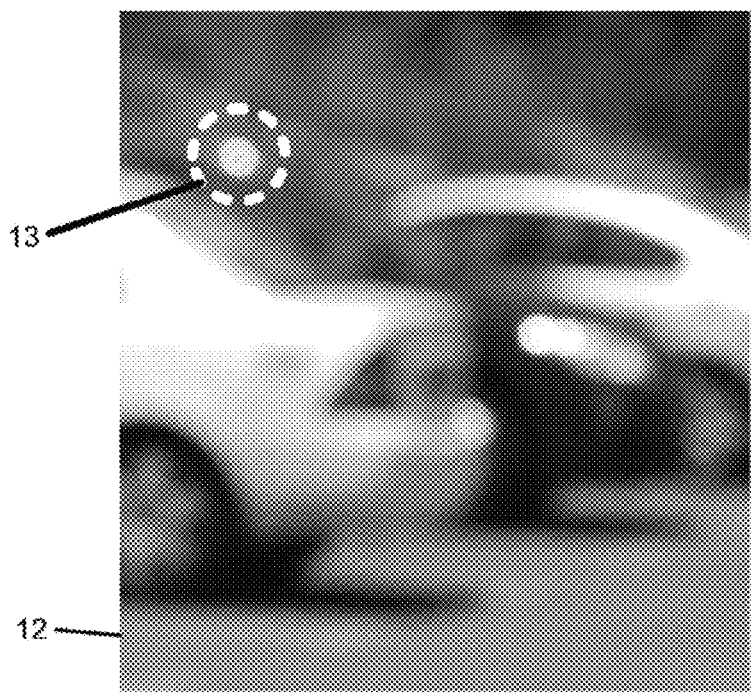
FIG. 1B is a blurred version of the image shown in FIG. 1A.

When an image of a scene is generated (by whatever process), blur degradation is frequently introduced and, by way of example, FIG. 1B shows a blurred image 12 of the FIG. 1A scene. As can be seen from FIG. 1B, the specular highlight of FIG. 1A now appears in the blurred image 12 as a bright blurred circular feature (indicated by dotted circle 13 that is centred on the highlight).

According to the embodiments of the invention described hereinafter, a specular highlight appearing in a blurred image is used to provide a high-accuracy blind estimate of blur degradation of the original scene. In particular, a blur kernel estimation is derived by extracting a specular highlight as foreground from the blurred image; this blur kernel is then used to recover the un-blurred image by deconvolution with the blurred image.

Figure 2:
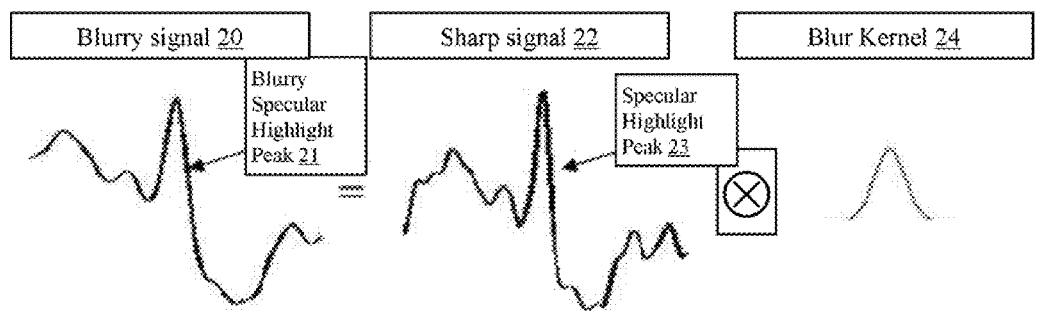
FIG. 2 is a diagram illustrating how a blurred image containing a specular highlight is related to the corresponding sharp image through a blur kernel.

In order to explain how the blur kernel is estimated, it will be useful to consider a simple example. Referring to FIG. 2, a signal 20 representing a blurred image (this signal here being called the 'blurry' signal below) includes a peak 21 that corresponds to a specular highlight in the blurred image. Notionally at least, the blurry signal 20 can be considered to be the result of convolving a signal 22 representing an un-blurred image of the original scene and a blur kernel 24 (the signal 22 is here called the 'sharp' signal and includes a peak 23 corresponding to the specular highlight). In FIG. 2, and elsewhere in this specification, the convolution operation is represented by the symbol $\hat{x}$.

Figure 3:
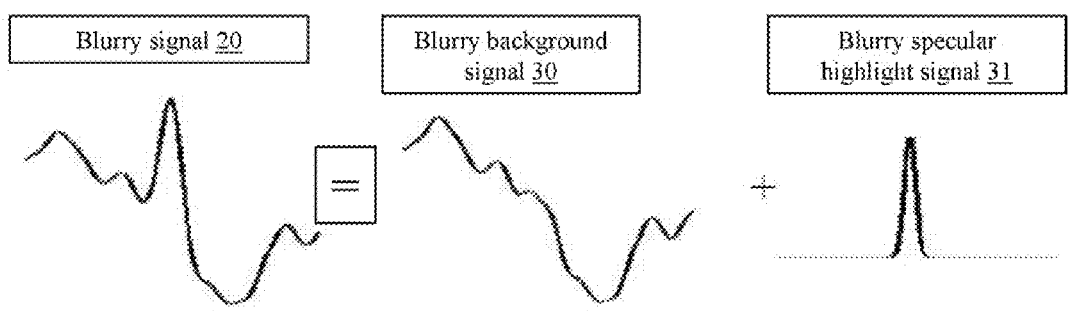
FIG. 3 is a diagram illustrating decomposition of the blurred image of FIG. 2 into a blurred background scene and a blurred specular highlight.

As depicted in FIG. 3, the blurry signal 20 can be considered to be the combination of a signal 31 representing the specular highlight in the blurred image (the 'blurry specular highlight' signal), and a signal 30 representing the background scene of the blurred image (the 'blurry background' signal).

Figure 4:
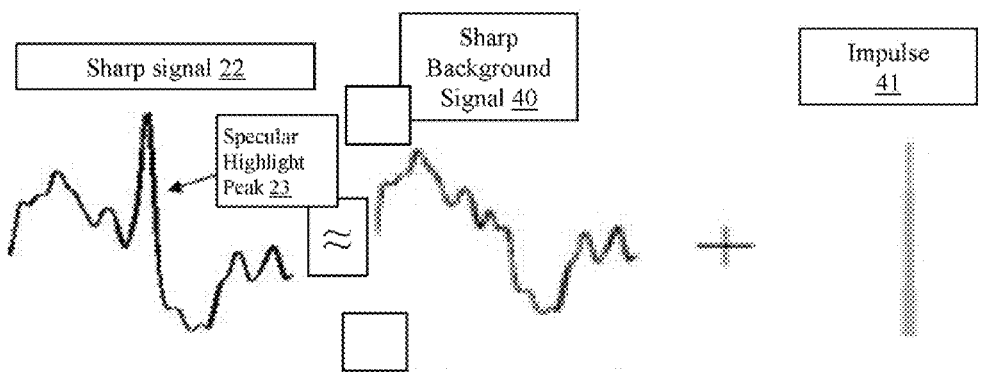
FIG. 4 is a diagram illustrating decomposition of the sharp image of FIG. 2 into a sharp background scene and an impulse.

The sharp signal 22 can similarly be decomposed into a signal representing the background scene of the un-blurred image (the 'sharp background' signal) and a signal representing the un-blurred specular highlight. Now, since the light energy of a specular highlight in a sharp image can assumed to be concentrated in a compact lobe, a specular highlight can be considered as approximating an impulse (a dirac function). As depicted in FIG. 4, the sharp signal 22 can therefore be taken as the combination of an impulse 41 representing the un-blurred specular highlight, and the 'sharp background' signal 40 representing the background scene of the un-blurred image (that is, without the specular highlight).

Figure 5:
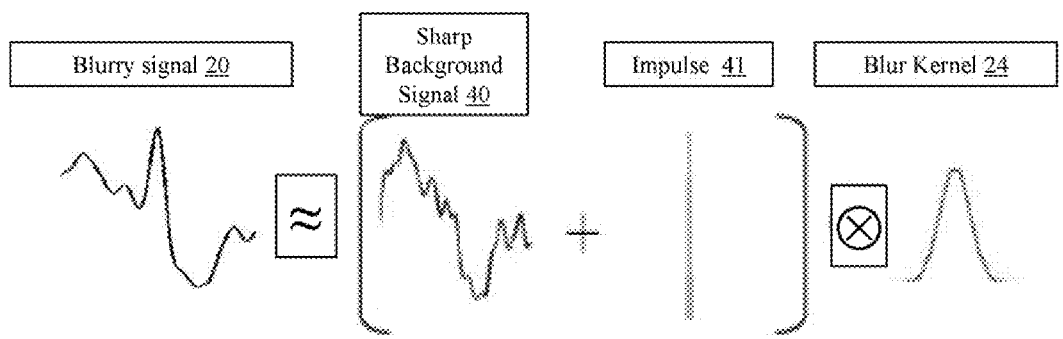
FIG. 5 is a diagram illustrating how the blurred image of FIG. 2 is related to the corresponding sharp background scene and an impulse through the blur kernel.

Since, as already depicted in FIG. 2, the blurry signal 20 corresponds to the convolution of the sharp signal 22 with blur kernel 24, the blurry signal 20 can be approximated by the convolution of the blur kernel 24 and the sum of the sharp background scene 40 and an impulse (see FIG. 5).

Figure 6:
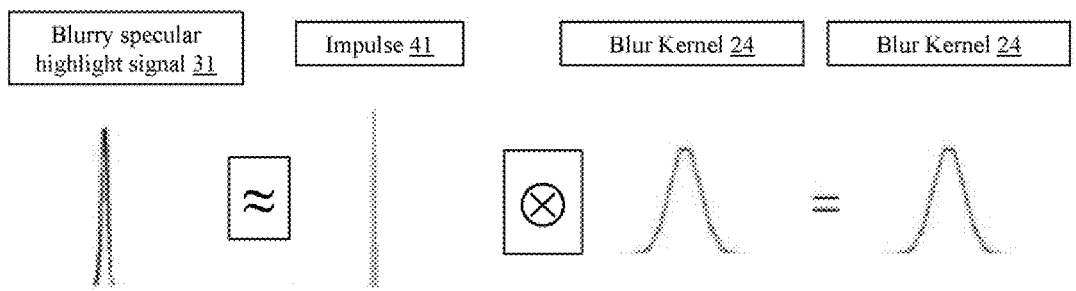
FIG. 6 is a diagram illustrating the relationship between the FIG. 3 blurred specular highlight, an impulse and the blur kernel.

From this it can be concluded that the blurry specular highlight 31 is a convolution between an impulse 41 and the blur kernel 24; hence, the blurry specular highlight 31 is the impulse response of the degradation process (see FIG. 6). In other words, if the blur function is position invariant throughout the image, then the blurry specular highlight 31 will be precisely the image blur kernel 24.

The above analysis shows that an accurate estimation of the image blur kernel can be achieved provided it is possible to separate effectively the blurry specular highlight from the rest of the image. Such a separation can be done in practice using the well known concept of image matting. Formally, image matting methods take as input an image 1, which is assumed to be a composite of a foreground image F and a background image B. The color of the i-th pixel is assumed to be a linear combination of the corresponding foreground and background colors, $$Ii = \alpha i \cdot Fi + (1 - \alpha i) \cdot Bi$$

where αi is the pixel's foreground opacity.

For present purposes of deriving the blur kernel by extracting a blurry specular highlight from a blurry image, the blurry specular highlight is taken as the foreground image to be extracted using a matting algorithm.

Figure 7:
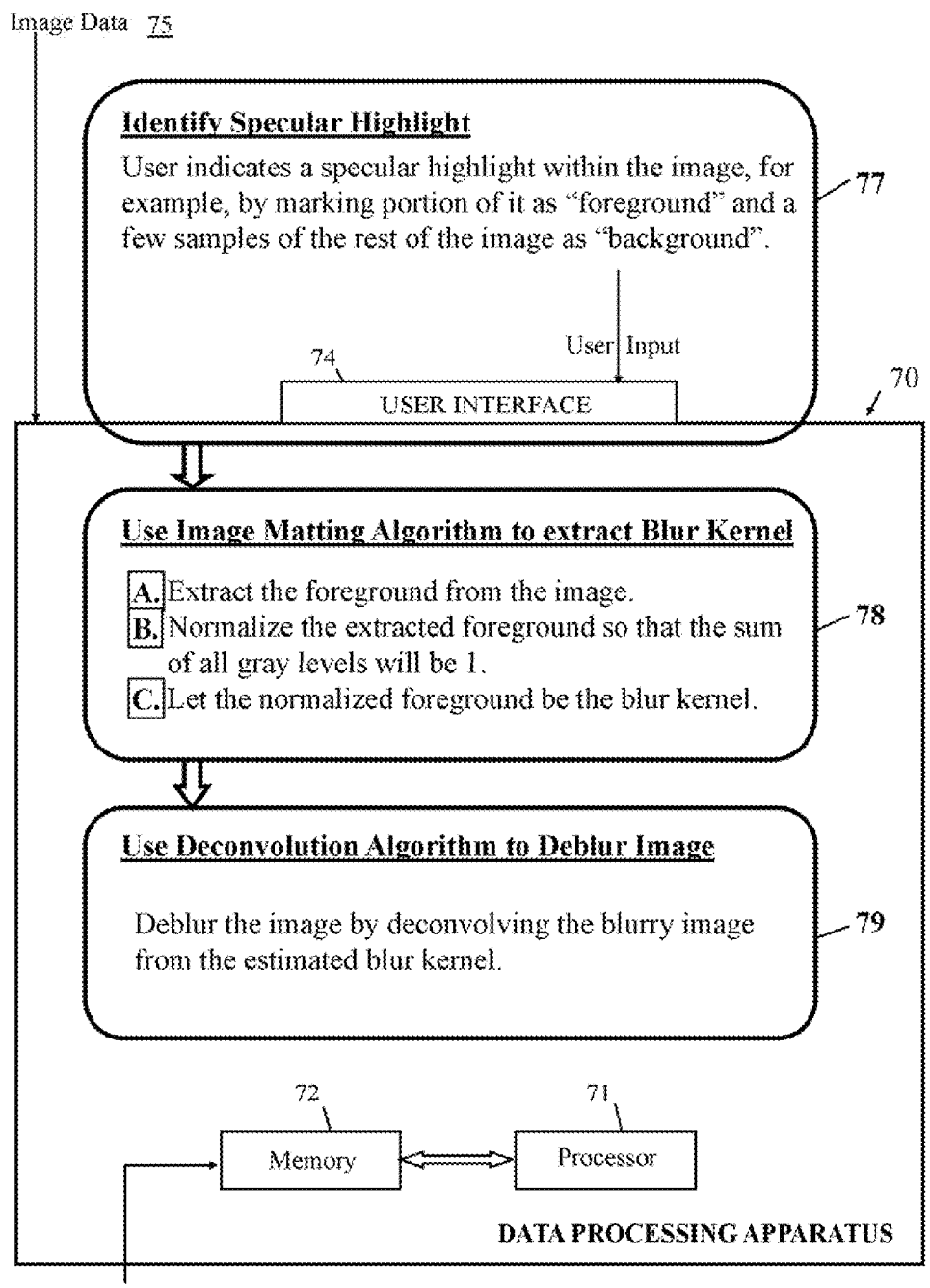
FIG. 7 is a diagram of apparatus embodying the invention overlaid with the main processing steps carried out with the aid of the apparatus.

FIG. 7 depicts an example embodiment of data processing apparatus 70 for deblurring a blurry input image received as image data 75. The apparatus comprises a processor 71 arranged to execute a deblur program read from memory 72 that is also used to hold the received image data 75 and, after generation by the processor 71, de-blurred image data. The deblur program is, for example, read into the memory 72 from a storage medium such as an optical disc 73 via an appropriate read/write device (not shown). The apparatus 70 further comprises a user interface 74 including both a display for presenting to the user the blurred input image represented by the image data 75, and a pointing device (such as a mouse) for enabling a user to select any location in a displayed image.

FIG. 7 also depicts the main steps 77, 78 and 79 of the image de-blurring method implemented by the deblur program run by the processor. These steps are as follows:

Step 77 Identification of Specular Highlight

In this step, a specular highlight in the received blurred image 75 is identified, in this case with the aid of user input. More particularly, the received image data is displayed to a user via user interface 74. The user then uses the pointing device of the interface 74 to point to specific image locations corresponding to a specular highlight thereby to indicate to the apparatus where a specular highlight is located in the image; the user may also indicate one or more image locations that are to be considered as background relative to the foreground constituted by the indicated specular highlight. The user input received in step 77 enables the apparatus 70 to identify a specular highlight and determine its bounds (though this may actually be effected integrally with the processing carried out for the next step).

Step 78 Extraction of Blur Kernel using Matting Algorithm

Once a specular highlight has been identified in the received image data, this information is passed to an alpha matting algorithm that extracts the foreground corresponding to the identified specular highlight from the rest of the image (that is, the image background). The extracted foreground is then normalized so that the sum of all gray levels will be 1. The normalized foreground is then treated as the blur kernel. A suitable alpha matting procedure is described in the paper "A Closed Form Solution to Natural Image Matting." A. Levin D. Lischinski and Y. Weiss, IEEE Conf. on Computer Vision and Pattern Recognition (CVPR), p. 61-68, Jun. 17-22, 2006, New York.

Step 79 Deblurring of Image by Deconvolution

The final step is to use the blur kernel derived in step 78 to deblur the received image by a deconvolution method such as the Lucy-Richardson method (see "An iterative techniques for the rectification of observed distributions," L. B. Lucy, Astronomical Journal, vol. 79, no. 6, pp. 745-754, 1974). An example implementation is the Matlab function "deconvlucy" (see "DECONVLUCY Image restoration using Lucy-Richardson algorithm." The MathWorks, Inc. Revision: 1.6 available at <http://ecco2.jpl.nasa.gov/data1/matlab/images/images/deconvlucy.m>). The deblurred image data is stored in memory 72 and preferably displayed to the used via interface 74.

Figure 8A:
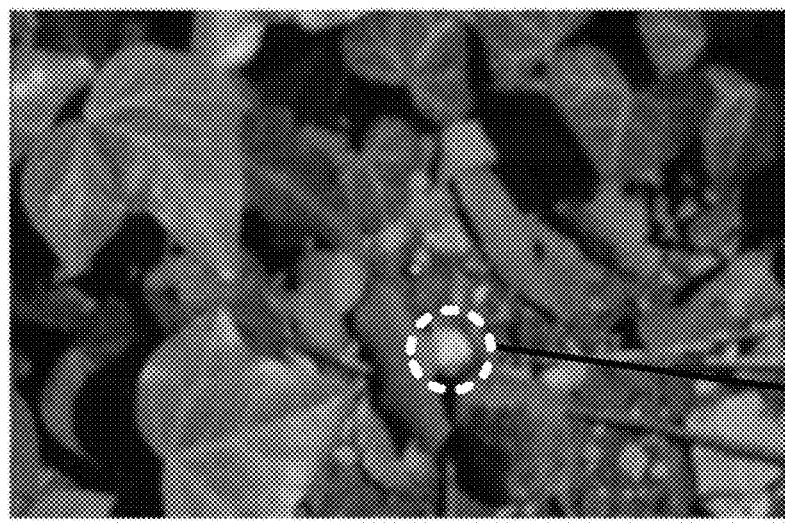
FIG. 8A is an example blurred input image exhibiting a blurred specular highlight received by the FIG. 7 apparatus.
Figure 8B:
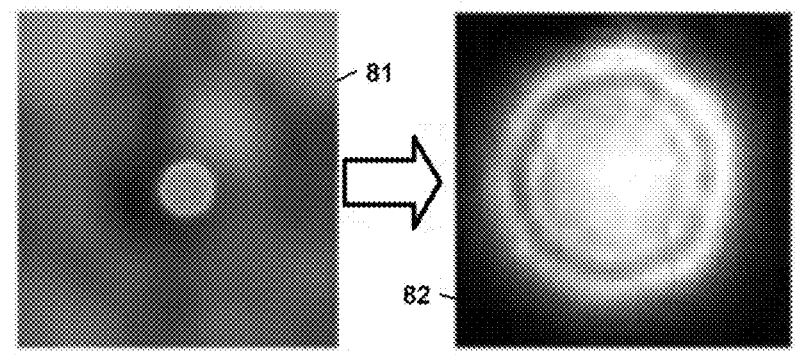
FIG. 8B is an enlarged view of the FIG. 8A blurred specular highlight.
Figure 8C:
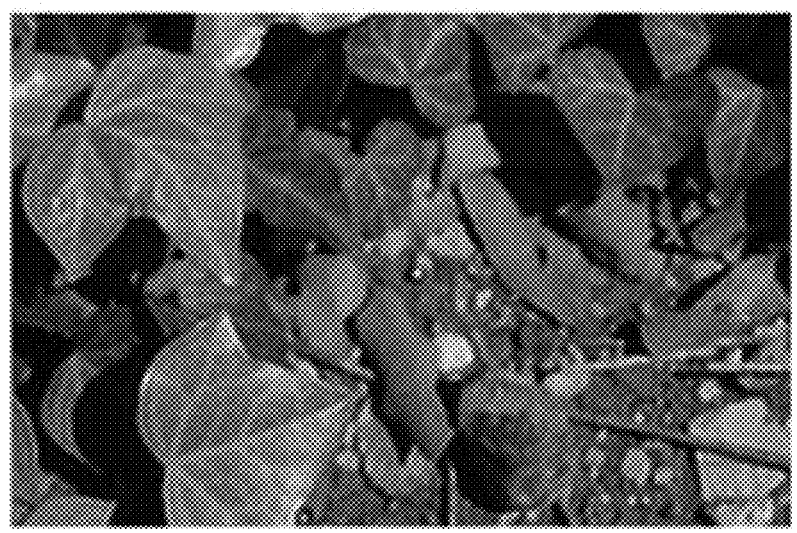
FIG. 8C shows the de-blurred version of the FIG. 8A image after processing by the FIG. 7 apparatus.

FIG. 8A shows an example blurred input image exhibiting a blurred specular highlight 80 received by the FIG. 7 apparatus. FIG. 8B shows enlarged views 81 and 82 of the FIG. 8A blurred specular highlight 80. FIG. 8C shows the de-blurred version of the FIG. 8A image after processing by the FIG. 7 apparatus.

While the above-described method of blur kernel estimation produces results that are accurate and robust, when applying the state of the art image deconvolution techniques (e.g., the Lucy-Richardson method), it is still common that the deconvolved image contains some visual artifacts. Thus, when using the Lucy-Richardson deconvolution method, the deblurred image may well contain ringing artifacts; however, these ringing artifacts are the result of the deconvolution algorithm used and not due to the inaccurate blur kernel estimations. In fact, a recent study has shown that the causes of these artifacts are the frequency-domain priors employed by the restoration algorithms. The paper "The Spatial Domain Approach for Image Restoration" HPL-2007-99, 20070823 by Ron Banner, Michal Aharon and Carl Staelin, (available at <http://library.hp.com/techpubs/2007/HPL-2007-99.pdf> suggests an algorithm that efficiently deblurs the image once the blur kernel is computed while significantly diminishing the ringing artifacts that are typical to classical deconvolution schemes.

Variants

It will be appreciated that many variants are possible to the above described embodiments of the invention. Thus, for example, any suitable matting algorithm can be used for step 78 and any suitable deconvolution algorithm can be used for step 79.

With regard to step 77 (identification of a specular highlight), rather than relying entirely on user input, it would be possible to arrange for the data processing apparatus 70 to analyze the received image data to identify one or more image features that are candidate specular highlights and then indicate these features on the image displayed to the user via the user interface 74; the user then need only indicate which proposed candidate feature is to be treated as the target specular highlight for processing in step 78. In fact, it would also be possible to dispense with the user input stage entirely and have the data processing apparatus itself select the image feature to be treated as the target specular highlight for processing in step 78. Several methods for the identification of specular highlights have been proposed in the literature (see, for example, the paper "Reducing Specular Reflection Components of Metallic Surfaces Using Photometric Linearization" Zhong Zhang, Ren Shiqing, M. Tetsuo, H. Fujiwara, and T. Imamura, Innovative Computing, Information and Control, 2006, IEEE ICICIC '06).

The invention claimed is:

1. A method of estimating blur degradation of an image that includes a specular highlight, the method comprising data processing apparatus (70):
    identifying a specular highlight in the image; and
    deriving a blur kernel by extracting the identified specular highlight as foreground from the image and using the extracted foreground as the blur kernel.

2. A method according to claim 1, wherein the extracted foreground is normalized for use as the blur kernel.

3. A method according to claim 1, wherein specular highlight is extracted from the image as foreground using an alpha matting algorithm.

4. A method according to claim 1, wherein the identifying of a specular highlight in the image is effected by the data processing apparatus on the basis of user input indicative of the location in the image of a specular highlight.

5. A method according to claim 4, wherein the user input also indicates background locations in the image.

6. A method according to claim 1, wherein the identifying of a specular highlight in the image is effected by the data processing apparatus by:
    selecting candidate image features as possible specular highlights,
    indicating to a user the selected candidate features in the image, and
    receiving user input as to which candidate feature is to be used as a specular highlight for further processing.

7. A method according to claim 1, wherein the identifying of a specular highlight in the image is effected automatically by the data processing apparatus without user input.

8. A method of deblurring an image that includes a specular highlight, the method comprising:
    using the method of claim 1 to derive a blur kernel; and
    deblurring the image by deconvolution using the derived blur kernel.

9. A method according to claim 8, wherein deconvolution is effected using the Lucy-Richard process.

10. Data processing apparatus for estimating blur degradation of an image, the data processing apparatus comprising a processor and a memory storing program code which, when executed by the processor, causes the data processing apparatus to perform operations comprising:
    identifying a specular highlight in the image; and
    deriving, a blur kernel by extracting the identified specular highlight as foreground from the image and using the extracted foreground as the blur kernel.

11. Apparatus according to claim 10, wherein, when executed the processor, the program code causes the data processing apparatus to perform operations comprising normalizing the extracted foreground for use as the blur kernel.

12. Apparatus according to claim 10, wherein, when executed by the processor, the program code causes the data processing apparatus to perform operations comprising extracting the specular highlight from the image as foreground using an alpha matting algorithm.

13. Apparatus according to claim 10, wherein the apparatus further comprises a user interface; and, when executed by the processor, the program code causes the data processing apparatus to perform operations comprising identifying a specular highlight in the image on the basis of user input received via the user interface, this user input being indicative of a location in the image of a specular highlight.

14. Apparatus according to claim 13, wherein the user input is further indicative of background locations in the image.

15. Apparatus according to claim 10, wherein the apparatus further comprises a user interface; and, when executed by the processor, the program code causes the data processing apparatus to perform operations comprising identifying a specular highlight in the image by:
    selecting candidate image features as possible specular highlights,
    indicating to a user, via the user interface (74), the selected candidate features in the image, and
    receiving user input, via the user interface, as to which candidate feature is to be used as a specular highlight for further processing.

16. Apparatus according to claim 10, wherein the identifying of a specular highlight in the image is effected automatically by the data processing apparatus without user input.

17. Apparatus according to claim 10, wherein, when executed by the processor, the program code causes the data processing apparatus to perform operations comprising deblurring the image by deconvolution using the derived blur kernel.

18. Apparatus according to claim 17, wherein deconvolution is effected using the Lucy-Richard process.

19. A non-transitory processor-readable memory for deblurring an image that includes at least one specular highlight, the processor-readable memory storing program code which, when executed by a processor, causes the processor to perform operations comprising:
   identifying a specular highlight in the image;
   deriving a blur kernel by extracting the identified specular highlight as foreground from the image and using the extracted foreground as the blur kernel;
   deblurring the image by deconvolution using the derived blur kernel.

* * * * *